(12) United States Patent
Kanota et al.

(10) Patent No.: US 6,363,211 B1
(45) Date of Patent: Mar. 26, 2002

(54) DATA RECORDING APPARATUS AND METHOD, DATA REPRODUCING APPARATUS AND METHOD, DATA RECORDING/REPRODUCING APPARATUS AND METHOD, AND TRANSMISSION MEDIUM

(75) Inventors: Keiji Kanota; Shunji Okada, both of Kanagawa; Nobuko Fujii, Miyagi, all of (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/079,934

(22) Filed: May 15, 1998

(30) Foreign Application Priority Data

May 23, 1997 (JP) .............................................. 9-134071

(51) Int. Cl.[7] .......................... H04N 5/928; H04N 5/76; H04N 5/781
(52) U.S. Cl. .......................... 386/96; 386/106; 386/107
(58) Field of Search .......................... 386/96, 107, 117, 386/120, 123, 46, 98, 104, 92, 95, 52, 55, 40, 39, 1, 4, 125, 105, 106, 45; H04N 5/928, 5/76, 5/781

(56) References Cited

U.S. PATENT DOCUMENTS 5,377,051 A * 12/1994 Lane et al. .................... 386/68
5,659,654 A * 8/1997 Nagasawa et al. .......... 386/120

* cited by examiner

*Primary Examiner*—Robert Chevalier
(74) *Attorney, Agent, or Firm*—Frommer Lawrence & Haug LLP; William S. Frommer; Dennis M. Smid (57) ABSTRACT

Video data and audio data inputted respectively from a camera system and a microphone are compressed and encoded in a video compressor/expander-encoder/decoder and an audio compressor/expander-encoder/decoder respectively, and then are multiplexed in a multiplexer. Subsequently the multiplexed data are supplied to a hard disk drive via an AV interface, a host bus, an interface adaptor and an interface. Information representing the kind of the data is written in a register. The data supplied to the hard disk drive are recorded in a disk, on the basis of such information, by a method conforming with the data. And in a reproduction mode, the data are reproduced, on the basis of such information, by a method conforming with the data. Thus, the data can be recorded or reproduced efficiently by the relevant method conforming with the kind of the data.

27 Claims, 8 Drawing Sheets

| CONTENTS | OFFSET | LENGTH |
|---|---|---|
| FILE NAME | 00h | 8 BYTES |
| EXTENDER | 08h | 3 BYTES |
| ATTRIBUTE | 0Bh | 1 BYTE |
| SYSTEM RESERV. | 0Ch | 10 BYTES |
| RENEWAL TIME | 16h | 1 WORD |
| RENEWAL DATA | 18h | 1 WORD |
| TOP CLUSTER NO. | 1Ah | 1 WORD |
| FILE SIZE | 1Ch | 1 DOUBLE WORD |

DATA RECORDING APPARATUS AND METHOD, DATA REPRODUCING APPARATUS AND METHOD, DATA RECORDING/REPRODUCING APPARATUS AND METHOD, AND TRANSMISSION MEDIUM

BACKGROUND OF THE INVENTION

The present invention relates to a data recording apparatus and method, a data reproducing apparatus and method, a data recording/reproducing apparatus and method, and a transmission medium, and more particularly to those where AV digital stream data and random access data, such as text data other than AV digital stream data, are recorded and reproduced by mutually different methods so that both data can be handled efficiently.

As observed in the technological history of hard disk drives (HDD) developed as peripherals of personal computers (PC), technical improvements have been achieved heretofore in realizing faster random access to discrete text data with high reliability.

With the recent progress in multimedia and so forth, there are demanded further improved HDD and host system which can constitute an AV HDD system at low cost for freely processing, on a disk, AV (audio visual) digital stream data such as DV (digital video) (transfer rate 29 Mbps) or MPEG2 (Moving Picture Experts Group Phase 2) (transfer rate 15 Mbps), and random access data other than such AV digital stream data.

However, in the related art HDD and host system, it is necessary, for enhancing the reliability of text type random access data, to write the data in a replacement sector which is a spare sector used when the relevant sector is defective, and also to execute retry (of instruction), servo compensation, temperature compensation and so forth. Consequently, in satisfying the requirements of both reliability and real-time continuity of the data being transmitted, there arise some problems such as the necessity of enhancing the fundamental performance of the HDD and a resultant high cost.

Intended enhancements of the above fundamental performance include, for example, increase of the capacity of a buffer memory, raise of the transfer rate attained by increasing the rotation speed, improvement of the performance of a channel coding LSI, a motor and so forth to shorten the rotation wait time, functional improvement of a servo circuit to shorten the seek time, and improvements of a head and disk media for realizing higher linear density recording.

SUMMARY OF THE INVENTION

It is therefore an object of the present invention to constitute a low-cost AV HDD system which is capable of freely processing, on a disk, both AV digital stream data and random access data other than such AV digital stream data.

According to a first aspect of the present invention, there is provided a data recording apparatus comprising an identifying means for identifying first data and second data; and a recording means for recording the first data by a first method in a recording medium, while recording the second data by a second method in the recording medium.

According to a second aspect of the invention, there is provided a data recording method comprising the steps of identifying first data and second data; and recording the first data by a first method in a recording medium, while recording the second data by a second method in the recording medium.

According to a third aspect of the invention, there is provided a data reproducing apparatus comprising an identifying means for identifying first data and second data; and a reproducing means for reproducing the first data by a first method from a recording medium, while reproducing the second data by a second method from the recording medium.

According to a fourth aspect of the invention, there is provided a data reproducing method comprising the steps of identifying first data and second data; and reproducing the first data by a first method from a recording medium, while reproducing the second data by a second method from the recording medium.

According to a fifth aspect of the invention, there is provided a data recording/reproducing apparatus comprising an identifying means for identifying first data and second data; a recording means for recording the first data by a first method in a recording medium, while recording the second data by a second method from the recording medium; and a reproducing means for reproducing the first data by a first method from the recording medium, while reproducing the second data by a second method from the recording medium.

According to a sixth aspect of the invention, there is provided a data recording/reproducing method comprising the steps of identifying first data and second data; recording the first data by a first method in a recording medium, while recording the second data by a second method in the recording medium; and reproducing the first data by a first method from the recording medium, while reproducing the second data by a second method from the recording medium.

And according to a seventh aspect of the invention, there is provided a transmission medium adapted for transmitting a computer program which has functions of identifying first data and second data; recording the first data by a first method in a recording medium, while recording the second data by a second method in the recording medium; and reproducing the first data by a first method from the recording medium, while reproducing the second data by a second method from the recording medium.

In the data recording apparatus of the first aspect, the identifying means identifies first data and second data, and the recording means records the first data by a first method in the recording medium, while records the second data by a second method in the recording medium.

In the data recording method of the second aspect, first data and second data are identified, and the first data are recorded by a first method in the recording medium, while the second data are recorded by a second method in the recording medium.

In the data reproducing apparatus of the third aspect, the identifying means identifies first data and second data, and the reproducing means reproduces the first data by a first method from the recording medium, while reproduces the second data by a second method from the recording medium.

In the data reproducing method of the fourth aspect, first data and second data are identified, and the first data are reproduced by a first method from the recording medium, while the second data are reproduced by a second method from the recording medium.

In the data recording/reproducing apparatus of the fifth aspect, the identifying means identifies first data and second data; then the recording means records the first data by a first method in the recording medium, while records the second data by a second method in the recording medium; and the reproducing means reproduces the first data by a first method from the recording medium, while reproduces the second data by a second method from the recording medium.

In the data recording/reproducing method of the sixth aspect, first data and second data are identified; then the first data are recorded by a first method in the recording medium, while the second data are recorded by a second method in the recording medium; and the first data are reproduced by a first method from the recording medium, while the second data are reproduced by a second method from the recording medium.

And in the transmission medium of the seventh aspect, there is transmitted a computer program having functions of identifying first data and second data; recording the first data by a first method in the recording medium, while recording the second data by a second method in the recording medium; and reproducing the first data by a first method from the recording medium, while reproducing the second data by a second method from the recording medium.

Thus, in the present invention, the data can be recorded and reproduced efficiently by the relevant method conforming with the kind of the data.

The above and other features and advantages of the present invention will become apparent from the following description which will be given with reference to the illustrative accompanying drawings.

DESCRIPTION OF THE PREFERRED EMBODIMENTS

Hereinafter the present invention will be described in detail with reference to the accompanying drawings.

Figure 1:
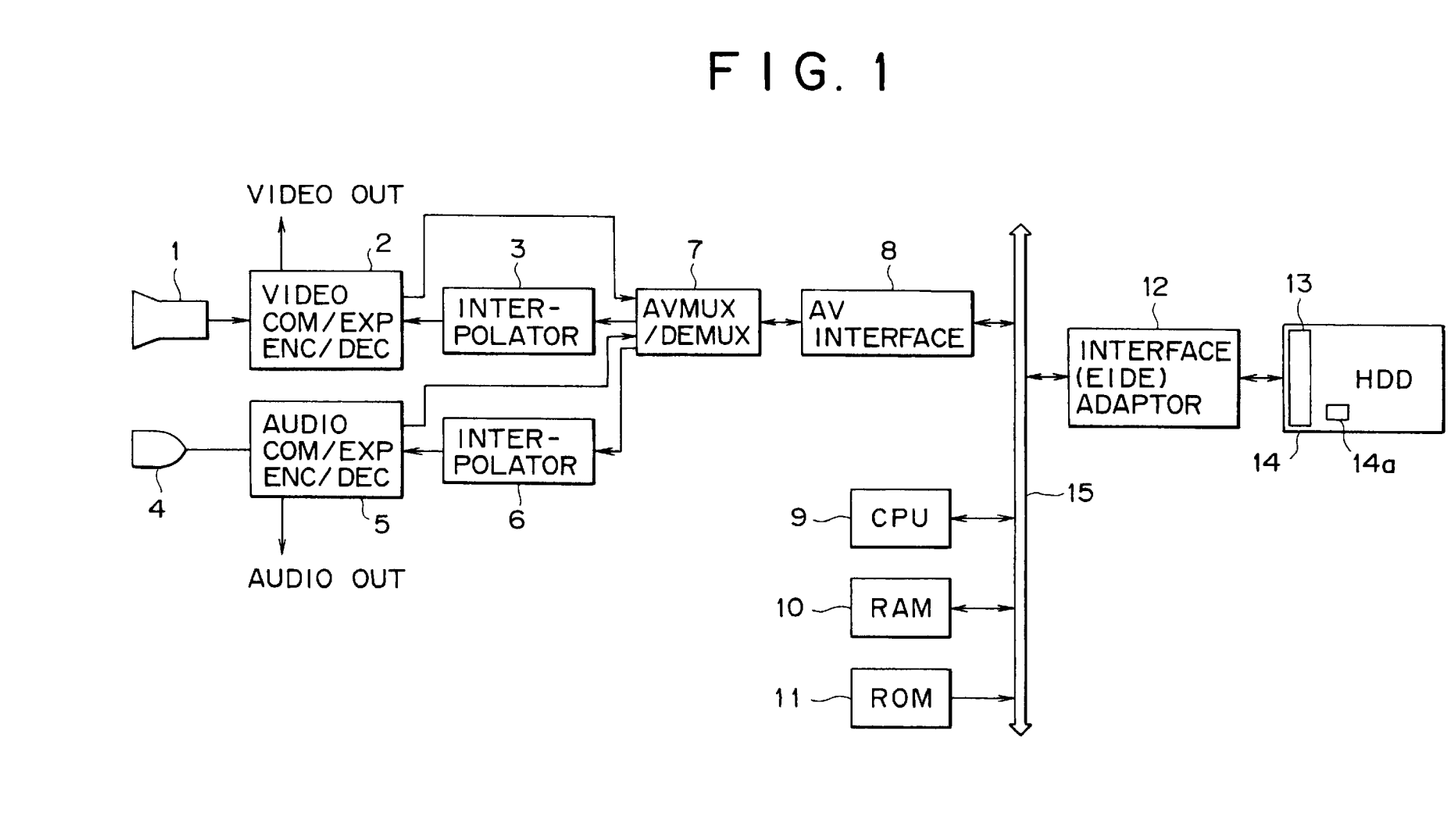
FIG. 1 is a block diagram showing a structural example of an embodiment which represents a disk camera system applying the present invention.

FIG. 1 is a block diagram showing an exemplary structure of a disk camera system where the recording/reproducing apparatus of the present invention is applied. A camera system 1 consisting of a lens, a CCD and so forth serves to shoot a desired image and then supplies a corresponding video signal to a video compressor/expander-encoderer (ENC)/decoder (DEC) 2. The video compressor/expander-encoder/decoder 2 converts the input video signal supplied thereto from the camera system 1 into digital video data and then compresses and encodes the converted video data; or decodes the video data supplied from an undermentioned interpolator 3 (interpolation means) and, after converting such video data into analog video signal, outputs the converted video signal therefrom.

The interpolator 3 executes a process of interpolation to the video data supplied from an undermentioned AV multiplexer/demultiplexer (MUX/DEMUX) 7, and supplies the processed video data to the video compressor/expander-encoder/decoder 2.

A microphone 4 inputs sound and, after transducing the same into a corresponding audio signal, supplies such signal to an audio compressor/expander-encoder/decodr 5. This audio compressor/expander-encoder/decoder 5 converts the audio signal supplied thereto from the microphone 4 into digital audio data and then compresses and encodes the same; or decodes the audio data supplied from an undermentioned interpolator 6 (interpolation means) and, after converting such audio data into analog audio signal, outputs the converted audio signal therefrom.

An AV multiplexer/demultiplexer 7 multiplexes the video data supplied from the video compressor/expander-encoder/decoder 2 with the audio data supplied from the audio compressor/expander-encoder/decoder 5, and then supplies the multiplexed data to an AV interface 8. The AV multiplexer/demultiplexer 7 further serves to separate the input data from the AV interface 8 into the video data and the audio data, and then supplies the video data to the interpolator 3 while supplying the audio data to the interpolator 6.

The AV interface 8 executes an interface process between the AV multiplexer/demultiplexer 7 and a host bus (connected apparatus bus) 15. A CPU (central processing unit) 9 controls component circuits in accordance with a program stored in a ROM (read only memory) 11. And a RAM (random access memory) 10 stores the data required for execution of a predetermined process by the CPU 9, or stores other data temporarily.

A hard disk drive (HDD) 14 is used for writing video data, audio data and text data supplied thereto via an interface 13, or reading out such data via the interface 13. The HDD 14 has a register 14a (storage means, error information storage means) controllable by the CPU 9, so that the HDD 14 can be controlled in response to a control command code set in the register 14a by the CPU 9. An interface adaptor 12 serves to execute an interface process between the host bus 15 and the hard disk drive 14. This HDD 14 may be either a fixed type or a removable type.

Now the operation of the above disk camera system will be described below. First, an explanation will be given on its operation performed in a recording mode. A desired image shot by the camera system 1 is converted into a corresponding video signal and then is supplied to the video compressor/expander-encoder/decoder 2. Subsequently the video signal supplied to the video compressor/expander-encoder/decoder 2 is converted into digital video data and, after being compressed and encoded through a predetermined process, the converted video data is supplied to the AV multiplexer/demultiplexer 7. Meanwhile the audio signal corresponding to the sound inputted to the microphone 4 is supplied to the audio compressor/expander-encoder/decoder 5. Then the audio signal thus supplied to the audio compressor/expander-encoder/decoder 5 is converted into digital audio data and, after being compressed and encoded through a predetermined process, the converted audio data is supplied to the AV multiplexer/demultiplexer 7.

The video data and the audio data supplied to the AV multiplexer/demultiplexer 7 are multiplexed to form AV digital stream data. For example, these are DV stream data defined by the consumer digital VCR format (DV format), or audio and video data compressed according to the MPEG2 (Moving Picture Experts Group phase 2) standard. The AV digital stream data thus obtained are read out by the CPU 9 via the AV interface 8 and the host bus 15, and then are supplied to the HDD 14 via the interface 13 of the HDD 14.

As will be described later, the CPU 9 sets, in the register 14a of the HDD 14, extender information which signifies that the data supplied to the HDD 14 are AV digital stream data.

On the basis of such extender information set in the register 14a the HDD 14 recognizes that the data supplied from the CPU 9 via the interface adaptor 12 are AV digital stream data, then files the AV digital stream data by a method corresponding thereto, and writes the same in a predetermined area on the disk.

Figure 2:
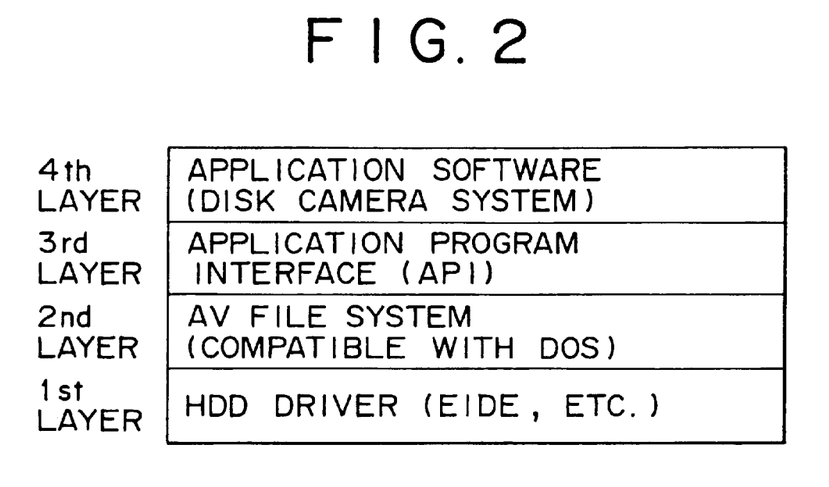
FIG. 2 shows a hierarchy of host side software.

FIG. 2 is a diagram showing a hierarchy of host side software executed by the CPU 9. The RAM 10 and the ROM 11 mentioned above are memory groups required by chip sets in the CPU 9 practically used. A fourth layer in the software hierarchy of FIG. 2 is application software for realizing an operation mode such as recording, reproduction, stop, cue, review or pause. A third layer relative to an API (application programming interface) is an interface regarding a kernel of an OS (operating system) for enabling easy description of the application software, where a C function group of ANSI (American National Standards Institute) for example is defined.

Figure 3:
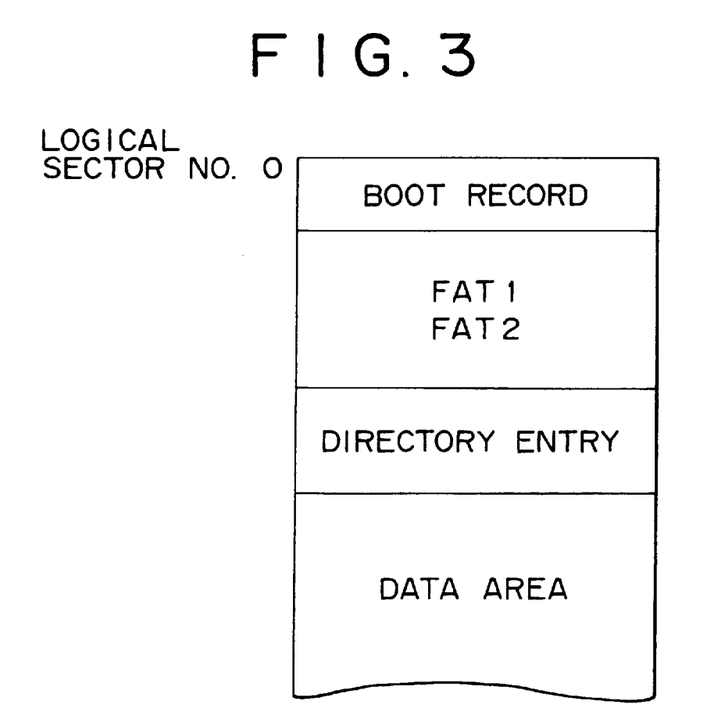
FIG. 3 shows an exemplary logical structure of a disk.

A second layer relative to an AV file system is middleware used for filing data by a predetermined method and recording the file in a predetermined location of the HDD 14 as a peripheral of the CPU 9. In this embodiment, a file system compatible with DOS (Disk Operating System) is employed. As shown in FIG. 3, the DOS file system manages the logical structure of a hard disk in the order from logical sector 0 to boot record area, FAT1 area, FAT2 area, directory entry, and data area.

Figure 4:
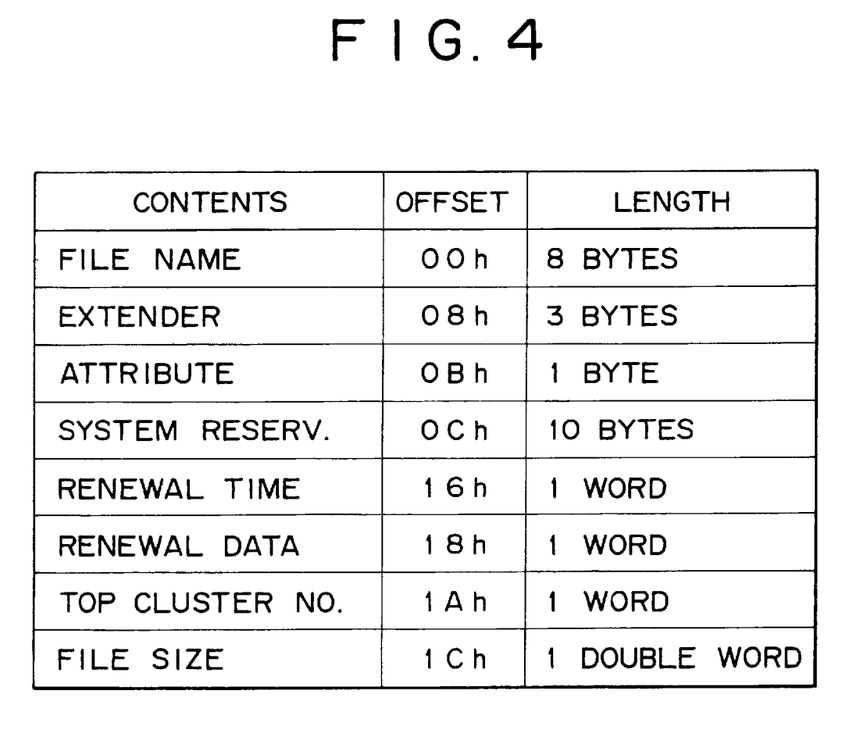
FIG. 4 is a diagram showing a directory entry.

FIG. 4 shows the composition of the directory entry. That is, the directory entry is composed of 8-byte file name, 3-byte extender information representing a file type, 1-byte file attribute, 10-byte system reservation, 1-word (2-byte) renewal time, 1-word renewal date, 1-word top cluster number indicating the top position of the file, and 2-word (4-byte) file size.

The HDD driver of the first layer is software for accessing the data on the basis of the proper function and specification of the CPU 9 practically in response to the interface 13 of the HDD 14. For example, EIDE (ATA (AT Attachment) standards) may be adopted for the host bus 15 and the interface of the HDD 14.

Referring now to a flowchart of FIG. 5, an explanation will be given on a processing routine executed by the CPU 9 in the case of recording AV digital stream data in the HDD 14. First at step Si, a decision is made as to whether or not the process to be executed currently by the CPU 9 is a recording process to the HDD 14. If the result of this decision is affirmative to signify a recording process, the operation proceeds to step S2, where extender information (e.g., avf) indicating an AV file of AV digital stream data is set in the register 14a of the HDD 14 via the interface 13.

Subsequently the operation proceeds to step S3, where the AV digital stream data composed of video data and audio data are read out from the AV multiplexer/demultiplexer 7 via the AV interface 8 and then are supplied to the HDD 14 via the interface adaptor 12.

Thereafter a decision is made at step S6 as to whether the entire data have been completely recorded or not. And if the result of this decision signifies that the entire data have not yet been recorded, the operation returns to step Si, and then the processes subsequent to step S1 are executed repeatedly. Meanwhile, if the result of the above decision signifies that the entire data have been completely recorded, the routine is terminated.

When AV digital stream data (DV or MPEG2 data stream) are filed and recorded in the manner mentioned above, a specific extender (e.g., avf) indicative of the AV digital stream data is set by the AV file system of the second layer in the software hierarchy of FIG. 2.

In a modification, the CPU 9 may inform the HDD 14 of attachment of a specific extender (e.g., avf) indicating AV digital stream data, via the HDD driver of the first layer by means of a vendor-unique command register in the register 14a of the HDD 14.

Next, an explanation will be given on the operation performed when reproducing the AV data file stored in the HDD 14. If the result of the decision made by the CPU 9 at step S1 in the flowchart of FIG. 5 signifies a process of reproduction, the operation proceeds to step S4, where a file corresponding to the relevant AV digital stream data is read out from the HDD 14 via the interface adaptor 12. Any error generated at the time of reading the file is detected by an undermentioned recording/reproduction signal processor 24 with reference to FIG. 9, so that information relative to such error is written in the register 14a. This file is supplied to the AV multiplexer/demultiplexer 7 via the AV interface 8.

Subsequently the operation proceeds to step S5, where the error information from the register 14a of the HDD 14 is supplied to the interpolators 3 and 6. Thereafter a decision is made at step S6 as to whether the entire designated data have been completely reproduced or not. And if the result of this decision signifies that the entire data have not yet been reproduced, the operation returns to step S1 and then the processes subsequent to step S1 are executed repeatedly. Meanwhile, if the result of the above decision signifies that the entire data have been completely reproduced, the routine is terminated.

Figure 6:
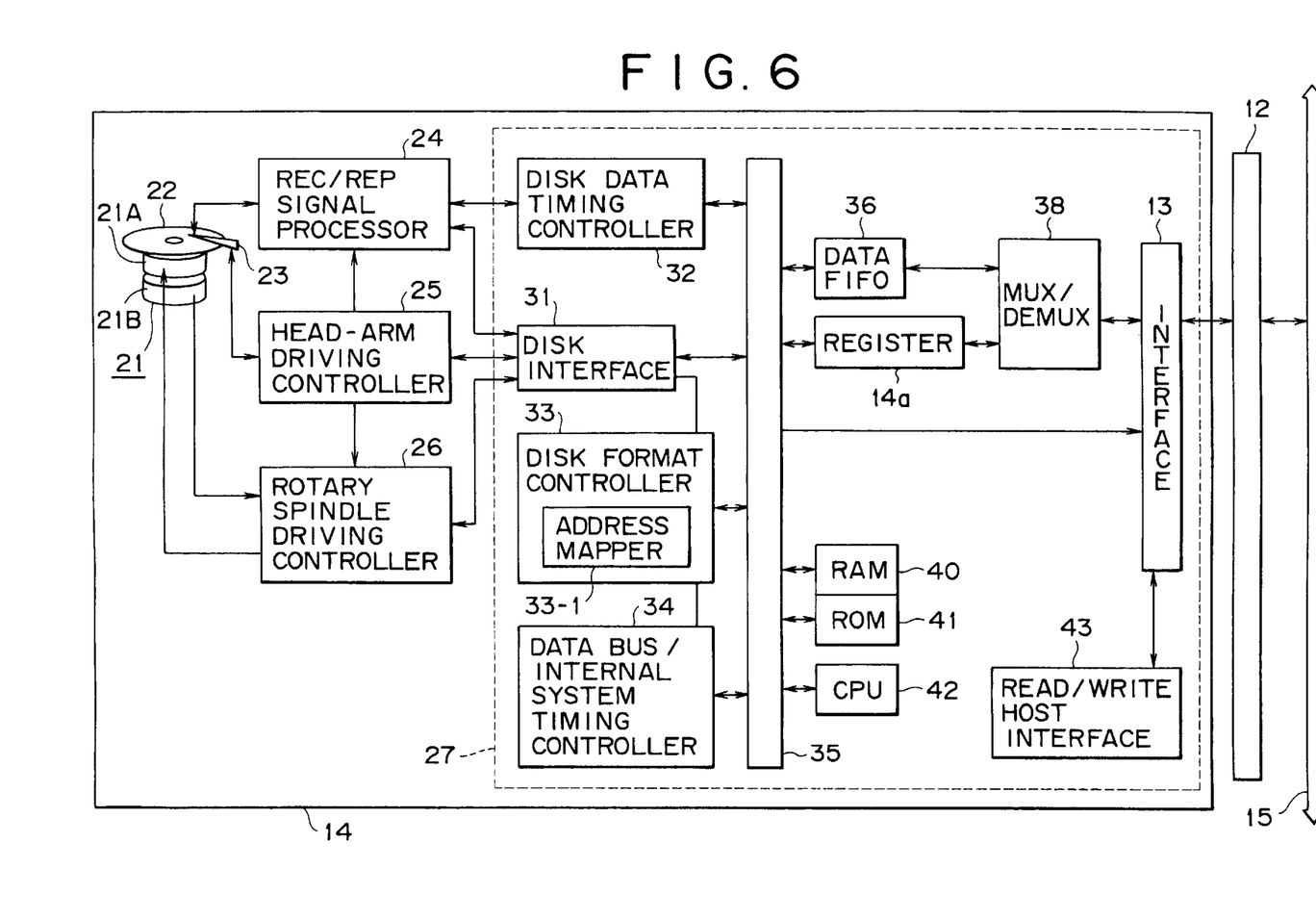
FIG. 6 is a block diagram showing a detailed structure of a hard disk drive (HDD)

FIG. 6 is a block diagram showing a detailed structural example of the HDD 14 in FIG. 1. A rotary driver 21 consists of a spindle motor 21A and a sensor 21B for detecting its rotation speed, and serves to rotate a magnetic disk 22 (storage means). A head unit 23 writes a record signal in the magnetic disk 22 and/or reads out the recorded signal therefrom.

A recording/reproduction signal processor 24 executes, in a recording mode, channel coding of a record signal to be written in the magnetic disk 22 to thereby convert the signal into a digital bit sequence conforming with the characteristic of a recording/reproduction system. And in a reproduction mode, this signal processor 24 executes reverse conversion, with respect to the recording mode, of a reproduction signal read out from the magnetic disk 22, and performs error detection and error correction thereof. A head-arm driving controller 25 moves a head-arm, which constitutes the head unit 23, to a predetermined track position on the magnetic disk 22. A rotary spindle driving controller 26 controls the driving of a spindle motor constituting the rotary driver 21.

A disk controller 27 serves to control the recording/reproduction signal processor 24, the head-arm driving controller 25 and the rotary spindle driving controller 26. And a disk interface 31 constituting the disk controller 27 executes an interface process between the recording/reproduction signal processor 24, the head-arm driving controller 25, the rotary spindle driving controller 26, and a disk format controller 33 and an internal system bus 35.

The disk format controller 33 executes address mapping control in accordance with an address mapper 33-1 where an address map of the data on the magnetic disk 22 is stored, and further executes a process of formatting the magnetic disk 22. A disk data timing controller 32 supplies a clock signal, which conforms with the rotation speed, to the recording/reproduction signal processor 24. And a data bus/internal system timing controller 34 supplies the clock signal to the other component circuits of the disk controller 27.

A multiplexer/demultiplexer 38 multiplexes a command from a register 14a with the data supplied via a data FIFO 36 and then supplies the multiplexed data to an interface adaptor 12 via an interface 13, or demultiplexes external data, which are supplied thereto via the interface adaptor 12, into data and a register command.

The data FIFO 36 sequentially stores the data supplied from the multiplexer/demultiplexer 38 and then outputs the data to the internal system bus 35 in the storage order, or sequentially stores the data supplied from the internal system bus 35 and then supplies the data to the multiplexer/demultiplexer 38 in the storage order. The register 14a stores any command, status or the like received from the multiplexer/demultiplexer 38 and outputs the same to the internal system bus 35, or stores any command, status or the like supplied from the internal system bus 35 and outputs the same to the multiplexer/demultiplexer 38.

A CPU 42 (identification means, recording means, reproduction means) controls the component circuits in accordance with a control program stored in a ROM 41 and performs control actions with regard to data recording and reproduction, operation of the driving mechanism, communication to a host computer and so forth in response to various disk parameters, commands and statuses of execution. A RAM 40 is used for storing data required in the CPU 42 to execute desired processes and further for storing other various data as well.

When data and a recording command thereof are supplied from an external apparatus via the interface 13, the multiplexer/demultiplexer 38 separates the data from the recording command, and then supplies the data to the data FIFO 36 while supplying the command or status to the register 14a. And when a data reproduction command is received from an external apparatus via the interface 13, the reproduction command is supplied to the register 14a. A read/write host interface 43 executes an interface process to the host computer.

Figure 7:
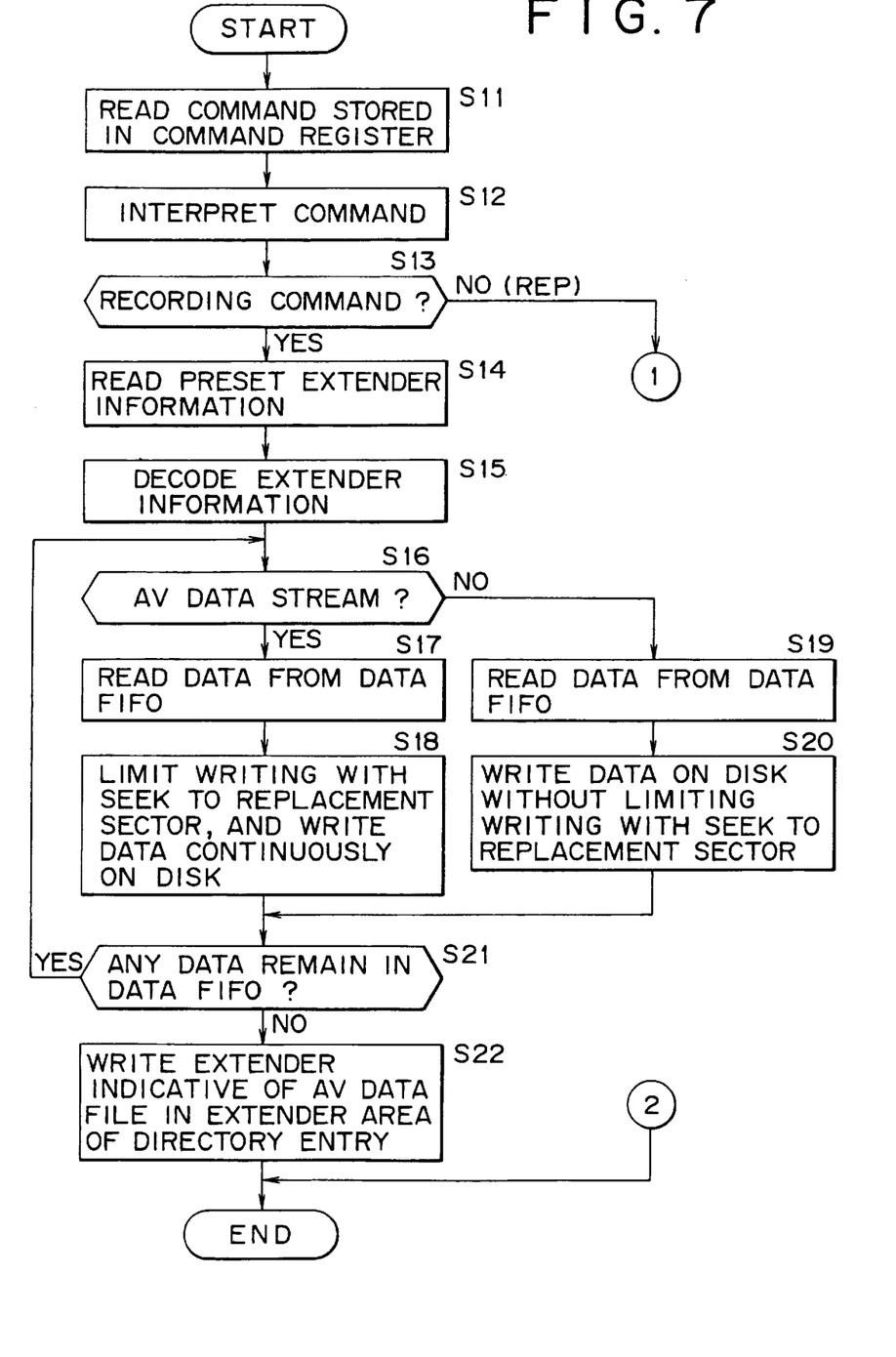
FIG. 7 is a flowchart for explaining the operation of a CPU in the HDD.

Now the operation of the CPU 42 will be described below with reference to a flowchart of FIG. 7 which shows the processing routine thereof. First, an explanation will be given on the operation performed when recording data on the magnetic disk 22. At the beginning, video data inputted from the camera system 1 and audio data inputted from the microphone 5 are read out by the CPU 9 of FIG. 1 via the AV interface 8 and then are supplied to the HDD 14 via the host bus 15 and the interface adaptor 12. And a recording command to instruct recording of such data on the magnetic disk 22 is supplied to the HDD 14 via the host bus 15 and the interface adaptor 12, while extender information (e.g., avf) indicating that the data supplied to the HDD 14 are AV digital stream data is set in the register 14a of the HDD 14.

The video data, audio data and recording command thus supplied to the HDD 14 are further supplied via the interface 13 to the multiplexer/demultiplexer 38 so as to be demultiplexed therein. And then the video data and the audio data are supplied to the data FIFO 36, while the recording command is supplied to the command status register 37.

Hereinafter a description will be given principally on the operation of the CPU 42 with reference to the flowchart of FIG. 7. First at step S11, the CPU 42 reads out the command stored in the command status register 37. Next at step S12, the CPU 42 interprets the command thus read at step S11. Thereafter a decision is made at step S13 as to whether the command thus read and interpreted is a recording command or not. And if the result of this decision is affirmative, the extender information set in the register 14a of the HDD 14 is read out.

Subsequently, the read extender information is decoded at step S15. Then the operation proceeds to step S16, where a decision is made, on the basis of the decoded extender information, as to whether the data supplied to the HDD 14 are AV digital stream data or not. And if the result of this decision is affirmative, the CPU 42 reads out the data from the data FIFO 36 at step S17. Next at step S18, the CPU 42 controls the component circuits in a manner to limit writing with seek to a replacement sector and to enable continuous writing of the data on the magnetic disk 22. That is, writing is performed with priority given to real-time continuity of the data rather than to reliability thereof.

The above operation can be performed by modifying the firmware of the disk controller 27.

Meanwhile, if the result of the decision at step S16 signifies that the data supplied to the HDD 14 are not AV digital stream data, i.e., the supplied data are random access data such as text data other than AV digital stream data, the operation proceeds to step S19, where the CPU 42 reads out the data from the data FIFO 36. Thereafter at step S20, the CPU 42 controls the component circuits in a manner to write the data on the magnetic disk 22 without limiting the writing with seek to a replacement sector, so that writing is performed with priority given to reliability of the data.

Upon termination of the process at step S18 or S20, the operation proceeds to step S21, where a decision is made as to whether any unprocessed data remain in the data FIFO 36. And if the result of this decision signifies that some unprocessed data remain in the data FIFO 36, the operation returns to step S16 and the processes subsequent to step S16 are executed repeatedly. Meanwhile, if the result of the above decision signifies that none of unprocessed data remains in the data FIFO 36, the operation proceeds to step S22, and an extender (e.g. avf) indicating an AV data file is written in a 3-byte extender area of the directory entry, and the processing routine is terminated.

In this manner, the AV digital stream data are stored in the magnetic disk 22 with the extender avf of a predetermined file name.

Next, the operation performed in a reproduction mode will be explained below. First, the CPU 9 in FIG. 1 supplies a reproduction command, which instructs reproduction of the data of a desired file name stored in the HDD 14, via the host bus 15 and the interface adaptor 12 to the HDD 14. The reproduction command thus supplied to the HDD 14 is further supplied via the interface 13 and the multiplexer/demultiplexer 38 to the register 14 and then is stored therein.

Figure 8:
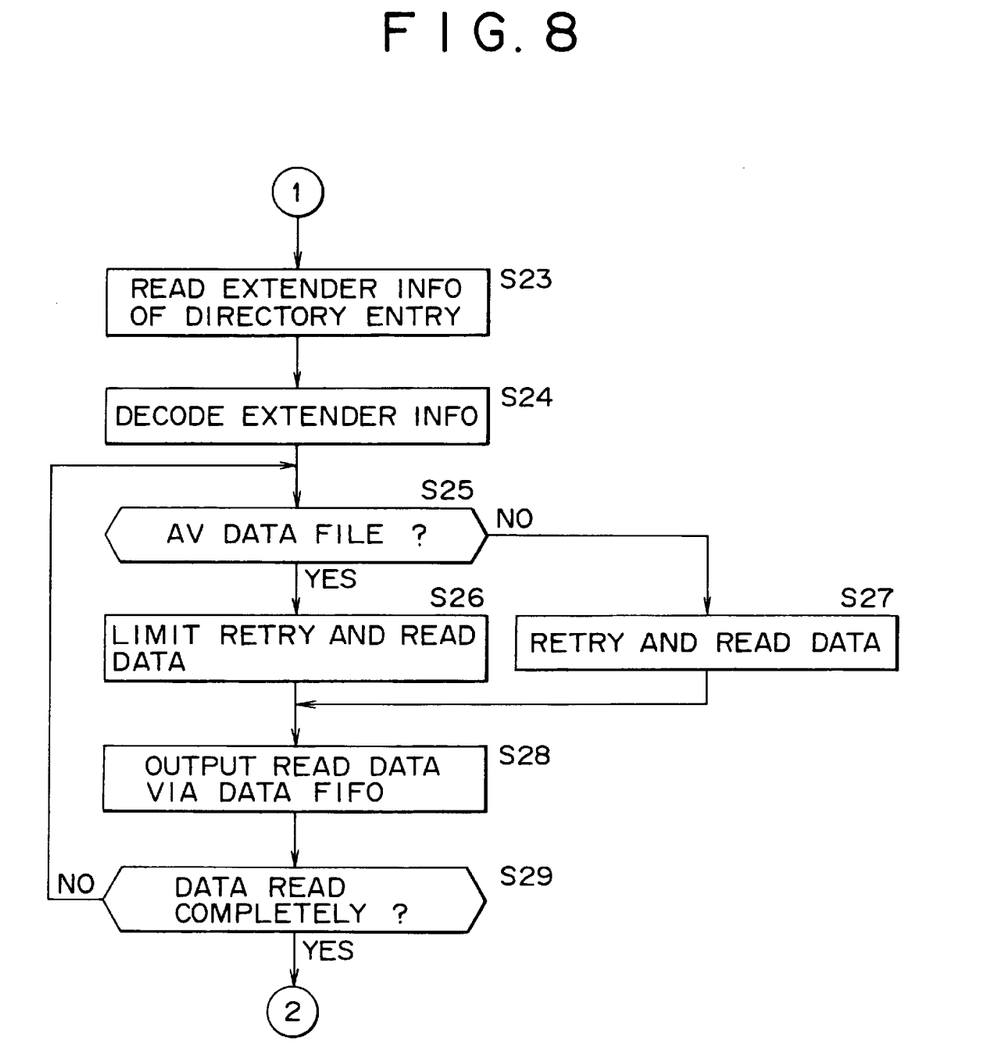
FIG. 8 is another flowchart for explaining the operation of the CPU in the HDD.

Hereinafter a description will be given principally on the operation of the CPU 42 with reference to the flowcharts of FIGS. 7 and 8. First at step S11, the CPU 42 reads out the command stored in the register 14. And at step S12, the CPU 42 interprets the command thus read. Thereafter a decision is made at step S13 as to whether the command thus read and interpreted is a recording command or not. Since it is a reproduction command in this case, the result of the above decision signifies a reproduction command, and then the operation proceeds to step S23 (FIG. 8).

At step S23, the CPU 42 controls the component circuits in the HDD 14 and reads out the extender information of the directory entry corresponding to the file recorded on the magnetic disk 22 and designated to be reproduced. Thereafter at step S24, the extender information read out at step S23 is decoded. And then at step S25, a decision is made, on the basis of the decoded extender information, as to whether or not the file designated to be reproduced is an AV data file composed of AV digital stream data.

If the result of the above decision signifies that the file to be reproduced is an AV data file, the operation proceeds to step S26, where the CPU 42 controls the component circuits in a manner to read out the AV data file while limiting a retry, so that the real-time continuity of the AV digital stream data can be secured. More specifically, any overhead such as rotation wait time due to a retry can be suppressed, and first priority is given to continuous reading of the AV data. Regarding the error information of the reproduction data, error flag information is obtained from the ECC circuit or the like included in the recording/reproduction signal processor 24 of the disk controller 27, and such information is set in the register 14a of the HDD 14, whereby the error information is transferred via the register 14a to the host side.

Next at step S28, the AV digital stream data thus read out from the magnetic disk 22 are supplied via the data FIFO 36, the multiplexer/demultiplexer 38 and the interface 13 to the interface adaptor 12.

Figure 5:
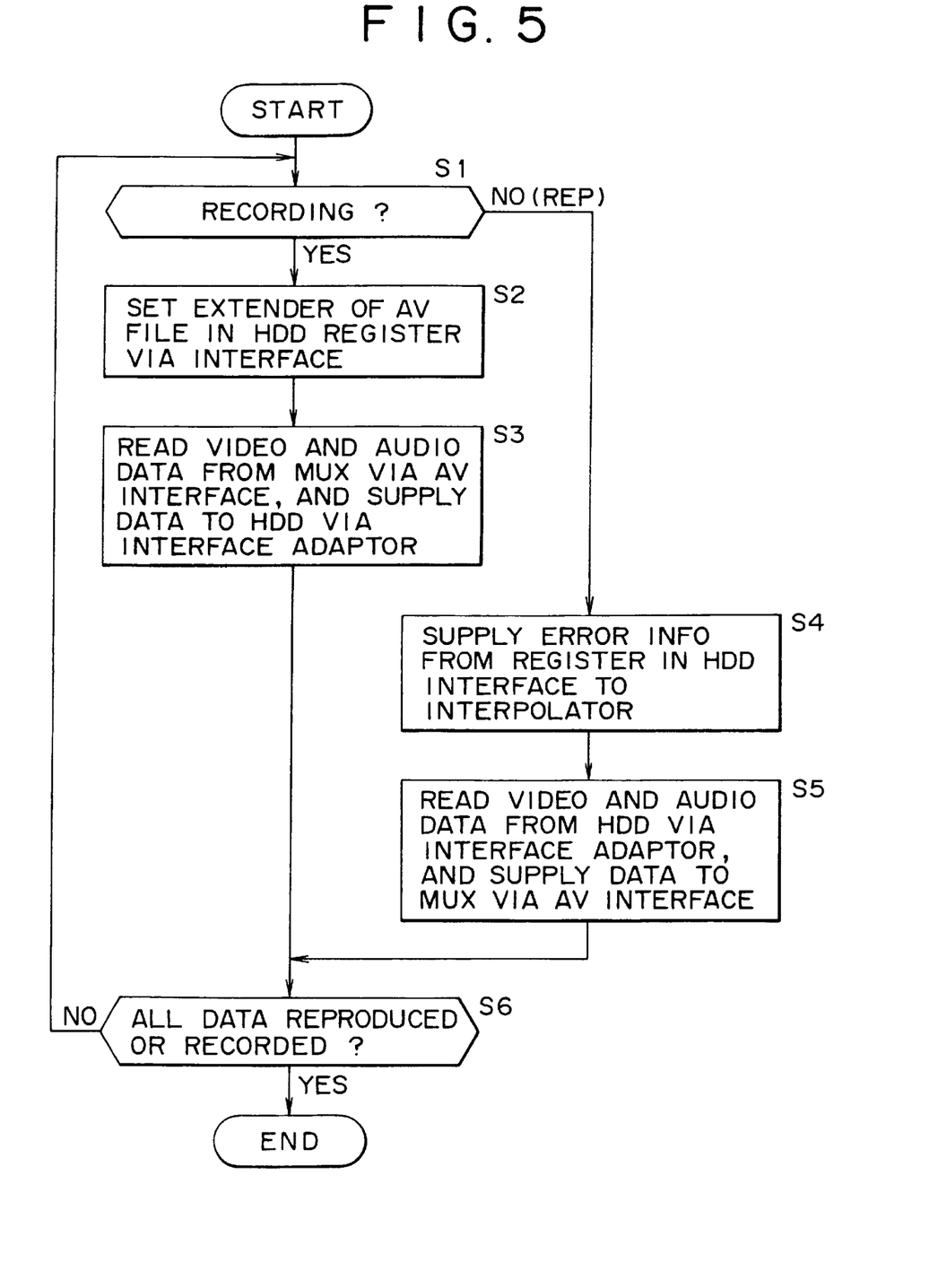
FIG. 5 is a flowchart for explaining the operation of a CPU on the host side.

Subsequently, as shown in the flowchart of FIG. 5, the error flag information relative to the reproduction-mode error set in the register 14a of the HDD 14 is read out at step S4 by the CPU 9 on the host side, and then is supplied via the AV interface 8 and the AV multiplexer/demultiplexer 7 respectively to the interpolator 3 and the interpolator 6. Thereafter at step S5, the AV digital stream data are read out via the interface adaptor 12, and the video data are supplied via the AV interface 8 and the AV multiplexer/demultiplexer 7 to the interpolator 3, while the audio data are supplied to the interpolator 6.

Consequently, intra-space or inter-frame interpolation (concealment) is executed in the interpolator on the basis of the error flag information. Then the data are expanded and decoded in the video compressor/expander-encoder/decoder 22, so that satisfactory reproduced picture signals can be obtained. In the DV format, concealment utilizing the correlation of the data is possible with regard to the compressed picture signals, hence realizing reduction of the memory capacity. Besides the above example, it is further possible to execute concealment utilizing the temporal or spatial correlation of the data with regard to the expanded and decoded picture signals.

Similarly, regarding the audio data also, the error flag information is used for triggering high-order concealment and so forth in the interpolator 6, whereby satisfactory reproduced audio signals can be obtained. And besides this example, concealment utilizing the temporal correlation of the data may be executed with regard to the expanded and decoded audio signals.

Thereafter the operation proceeds to step S6, where a decision is made as to whether recording or reproduction of the entire data (the AV data file designated to be reproduced) has been completed or not. If the result of this decision signifies that reproduction of the entire data has not yet been completed, the operation returns to step S1 and then the processes subsequent to step S1 are executed repeatedly. Meanwhile, if the result of the above decision signifies complete reproduction of the entire data, the processing routine is terminated.

Thus, the kind of the data is recognized by decoding the extender information of the directory entry, and the data can be recorded on or reproduced from the magnetic disk 22 by a different method conforming with the recognized kind of the data. For example, when recording or reproducing any data file where the data have temporally or spatially close correlation such as AV data, continuous real-time writing or reading is executed with priority; and when recording or reproducing any PC (personal computer) data such as conventional text data which are random access data other than AV digital stream data, priority can be given to reliability of the data.

Figure 9:
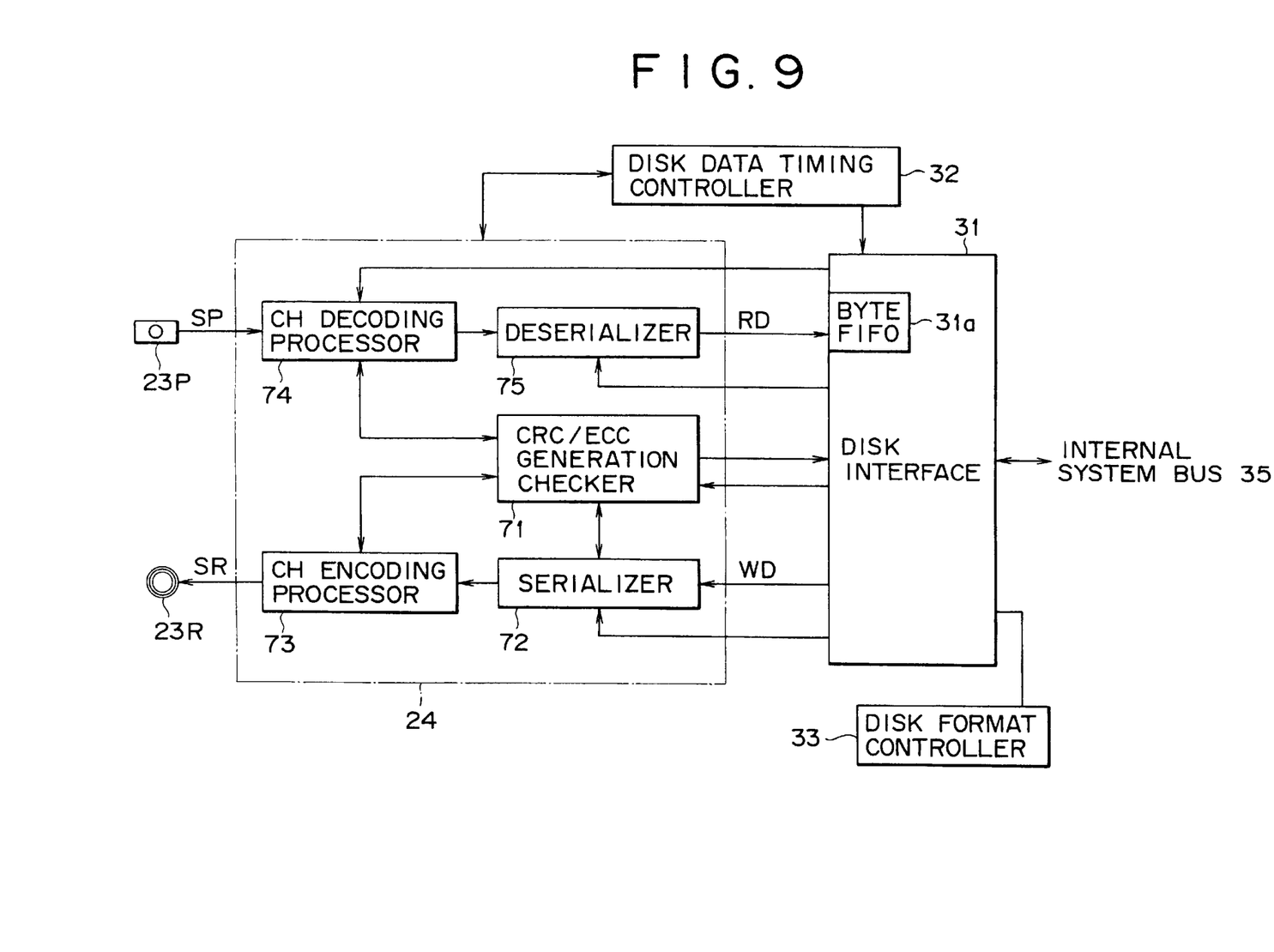
FIG. 9 is a block diagram showing detailed structural examples of a recording/reproduction signal processor and a disk interface.

Next, the structures of the recording/reproduction signal processor 24, the disk interface 31 and so forth will be described with reference to FIG. 9. A clock signal is supplied from the disk data timing controller 32 to the recording/reproduction signal processor 24 and a portion of the disk interface 31.

The recording/reproduction signal processor 24 comprises a CRC/ECC generation checker 71 for generating CRC (cyclic redundancy check codes) and ECC (error correction code) relative to the write data WD and executes, with regard to the read data RD, error detection based on the CRC and error correction based on the ECC; a serializer 72 for converting, relative to the write data WD supplied from the disk interface 31, parallel bit data on the bus into serial track data, and attaches thereto the CRC and ECC generated in the CRC/ECC generation checker 71; and a channel encoding processor 73 for obtaining a recording signal SR through data modulation and so forth of the serial track data. The recording signal SR outputted from this processor 73 is supplied to a recording magnetic head 23R.

The recording/reproduction signal processor 24 further comprises a channel decoding processor 74 for obtaining read data with the CRC and ECC attached thereto through data demodulation of the reproduction signal SP outputted from a reproducing magnetic head 23P; and a deserializer 75 for converting the serial track data, which are outputted from the channel decoding processor 74, into parallel bit data on the bus. The read data RD outputted from the deserializer 75 are supplied to the disk interface 31. This interface 31 has a byte FIFO 31a to compensate for any dropout or error per byte on the basis of the error information detected by the CRC/ECC generation checker 71. The error information is set in the register 14a via the disk interface 31.

In the above description of the preferred embodiment representing the AV file system of the present invention, the example is explained as a DOS-compatible 16-bit FAT file system including 8 bytes for file name and 3 bytes for extender information. Similarly, the present invention may also be used in a file system having an extender, such as a DOS-compatible VFAT file system with a maximum of 255 bytes for file name, or a 32-bit FAT file system, wherein the kind of the data is identified by decoding and recognizing the extender information, so that the data can be recorded on or reproduced from the magnetic disk 22 by a different method conforming with the kind of the data.

Data to be recorded continuously such as AV digital stream data, and discrete data to be recorded discretely such as text data, can be handled as the same file seemingly. Therefore, it becomes possible to facilitate development of improved application software adapted to handle a variety of data. It is further possible to realize a low-cost HDD which ensures both continuity of AV digital stream data and reliability of text data.

Besides the above, since the file is compatible with a PC file, any application software based on the present invention is adapted for common use of data with a PC, hence enabling development of PC application software. In addition, it is further possible to easily construct a low-cost system employing a hard disk which realizes efficient handling of both AV digital stream data and random access data other than such AV digital stream data.

It is to be understood that, in this specification, the transmission medium for transmitting a program connotes any information recording medium such as removable HDD, ROM, FD (floppy disc), CD-ROM (compact disc-read only memory), and also any network transmission medium such as Internet, digital satellite or the like.

The explanation given above for the preferred embodiments is concerned with an exemplary case of recording data on and/or reproducing the same from a hard disk drive. However, the present invention is applicable also to recording and reproduction of data on or from any other recording medium as well.

Although the present invention has been described hereinabove with reference to the preferred embodiments thereof, it is to be understood that the invention is not limited to such embodiments alone, and a variety of other changes and modifications will be apparent to those skilled in the art without departing from the spirit of the invention.

The scope of the invention, therefore, is to be determined solely by the appended claims.

What is claimed is:

1. A data recording apparatus comprising:
   an identifying means for identifying first data and second data of mutually different kinds; and
   a recording means for recording the first data by a first method in said recording medium, while recording the second data by a second method in said recording medium,
   whereby in said first method the recording of the first data is limited to a replacement sector and whereby in said second method the recording of the second data is not limited to a replacement sector.

2. The data recording apparatus according to claim 1, wherein the first data are those closely correlated, and the second data are those not correlated.

3. The data recording apparatus according to claim 2, wherein the first data are temporally continuous.

4. The data recording apparatus according to claim 1, wherein the first data are composed of audio and/or video data streams, and the second data are random access data other than audio and/or video data streams.

5. The data recording apparatus according to claim 1, wherein said recording means records, in said recording medium, the first data and the second data as a file.

6. The data recording apparatus according to claim 5, further comprising a storage means for storing specific extender information which represents a file kind assigned to said file, wherein said identifying means identifies the first data and the second data on the basis of such extender information.

7. A data recording apparatus comprising:
   an identifying means for identifying first data and second data of mutually different kinds;
   a recording means for recording the first data by a first method in said recording medium, while recording the second data by a second method in said recording medium, wherein said recording means records in said recording medium the first data and the second data as a file; and
   a storage means for storing specific extender information which represents a file kind assigned to said file,
   wherein said identifying means identifies the first data and the second data on the basis of such extender information, and
   wherein, when recording the first data in said recording medium, said recording means limits, by said first method, seek to a replacement sector formed at the time of formatting said recording medium.

8. A data recording method comprising the steps of:
   identifying first data and second data of mutually different kinds; and
   recording the first data by a first method in said recording medium, while recording the second data by a second method in said recording medium,
   whereby in said first method the recording of the first data is limited to a replacement sector and whereby in said second method the recording of the second data is not limited to a replacement sector.

9. A data reproducing apparatus comprising:
   an identifying means for identifying first data and second data of mutually different kinds; and
   a reproducing means for reproducing the first data by a first method from said recording medium, while reproducing the second data by a second method from said recording medium,
   whereby in said first method the first data is reproduced while limiting a number of retries and whereby in said second method the second data is reproduced while not limiting the number of retries.

10. The data reproducing apparatus according to claim 9, wherein the first data are those closely correlated, and the second data are those not correlated.

11. The data reproducing apparatus according to claim 10, wherein the first data are temporally continuous.

12. The data reproducing apparatus according to claim 9, wherein the first data are composed of audio and/or video data streams, and the second data are random access data other than audio and/or video data streams.

13. The data reproducing apparatus according to claim 9, wherein said reproducing means reproduces, as a file, the first data and the second data recorded in said recording medium.

14. The data reproducing apparatus according to claim 13, further comprising a storage means for storing specific extender information which represents a file kind assigned to said file, wherein said identifying means identifies the first data and the second data on the basis of such extender information.

15. The data reproducing apparatus according to claim 14, wherein, when reproducing the first data from said recording medium, said reproducing means limits, by said first method, an operation to inhibit a process of continuously reading out the first data.

16. The data reproducing apparatus according to claim 9, further comprising:
   an error information storage means for storing error information generated when said reproducing means reproduces the first data from said recording medium; and
   an interpolation means for interpolating the first data reproduced by said reproducing means, on the basis of the error information stored in said error information storage means.

17. A data reproducing method comprising the steps of:
   identifying first data and second data of mutually different kinds; and reproducing the first data by a first method from said recording medium, while reproducing the second data by a second method from said recording medium, whereby in said first method the first data is reproduced while limiting a number of retries and whereby in said second method the second data is reproduced while not limiting the number of retries.

18. A data recording/reproducing apparatus comprising:

an identifying means for identifying first data and second data of mutually different kinds;

a recording means for recording the first data by a first method in said recording medium, while recording the second data by a second method in said recording medium, whereby in said first method the recording of the first data is limited to a replacement sector and whereby in said second method the recording of the second data is not limited to a replacement sector; and a reproducing means for reproducing the first data by a first method from said recording medium, while reproducing the second data by a second method from said recording medium, whereby in said first method the first data is reproduced while limiting a number of retries and whereby in said second method the second data is reproduced while not limiting the number of retries.

19. The data recording/reproducing apparatus according to claim 18, Wherein the first data are those closely correlated, and the second data are those not correlated.

20. The data recording/reproducing apparatus according to claim 19, wherein the first data are temporally continuous.

21. The data recording/reproducing apparatus according to claim 18, wherein the first data are composed of audio and/or video data streams, and the second data are random access data other than audio and/or video data streams.

22. The data recording/reproducing apparatus according to claim 18, wherein said recording means records, in said recording medium, the first data and the second data as a file; and said reproducing means reproduces, as a file, the first data and the second data recorded in said recording medium.

23. The recording/reproducing apparatus according to claim 22, further comprising a storage means for storing specific extender information which represents a file kind assigned to said file, wherein said identifying means identifies the first data and the second data on the basis of such extender information.

24. A recording/reproducing apparatus comprising:

an identifying means for identifying first data and second data of mutually different kinds;

a recording means for recording the first data by a first method in said recording medium, while recording the second data by a second method in said recording medium, wherein said recording means records in said recording medium the first data and the second data as a file;

a reproducing means for reproducing the first data by a first method from said recording medium, while reproducing the second data by a second method from said recording medium, wherein said reproducing means reproduces as a file the first data and the second data recorded in said recording medium; and a storage means for storing specific extender information which represents a file kind assigned to said file, wherein said identifying means identifies the first data and the second data on the basis of such extender information, and wherein, when recording the first data in said recording medium, said recording means limits, by said first method, seek to a replacement sector formed at the time of formatting said recording medium; and when reproducing the first data from said recording medium, said reproducing means limits, by said first method, an operation to inhibit a process of continuously reading out the first data.

25. The data recording/reproducing apparatus according to claim 18, further comprising:

an error information storage means for storing error information generated when said reproducing means reproduces the first data from said recording medium; and an interpolation means for interpolating the first data reproduced by said reproducing means, on the basis of the error information stored in said error information storage means.

26. A data recording/reproducing method comprising the steps of:

identifying first data and second data of mutually different kinds;

recording the first data by a first method in said recording medium, while recording the second data by a second method in said recording medium, whereby in said first method the recording of the first data is limited to a replacement sector and whereby in said second method the recording of the second data is not limited to a replacement sector; and reproducing the first data by a first method from said recording medium, while reproducing the second data by a second method from said recording medium, whereby in said first method the first data is reproduced while limiting a number of retries and whereby in said second method the second data is reproduced while not limiting the number of retries.

27. A transmission medium for transmitting a computer program used in a data recording/reproducing apparatus which records or reproduces first data and second data of mutually different kinds in or from a recording medium, said computer program having functions of:

identifying the first data and the second data;

recording the first data by a first method in said recording medium, while recording the second data by a second method in said recording medium, whereby in said first method the recording of the first data is limited to a replacement sector and whereby in said second method the recording of the second data is not limited to a replacement sector; and reproducing the first data by a first method from said recording medium, while reproducing the second data by a second method from said recording medium, whereby in said first method the first data is reproduced while limiting a number of retries and whereby in said second method the second data is reproduced while not limiting the number of retries.

* * * * *